US011504871B2

(12) United States Patent
Blasi

(10) Patent No.: US 11,504,871 B2
(45) Date of Patent: Nov. 22, 2022

(54) SHAFT CUTTING TOOL

(71) Applicant: Robert A. Blasi, Pratt, KS (US)

(72) Inventor: Robert A. Blasi, Pratt, KS (US)

(73) Assignees: Robert A. Blasi, Pratt, KS (US);
Teresa K. Blasi, Pratt, KS (US)

( * ) Notice: Subject to any disclaimer, the term of this patent is extended or adjusted under 35 U.S.C. 154(b) by 22 days.

(21) Appl. No.: 16/654,560

(22) Filed: Oct. 16, 2019

(65) Prior Publication Data
US 2021/0114243 A1 Apr. 22, 2021

(51) Int. Cl.
| | | |
|---|---|---|
| *B26D 3/16* | (2006.01) | |
| *B26D 7/02* | (2006.01) | |
| *B26D 7/26* | (2006.01) | |
| *B23D 45/04* | (2006.01) | |
| *B24B 23/02* | (2006.01) | |
| *B24B 23/08* | (2006.01) | |
| *B24B 27/06* | (2006.01) | |

(52) U.S. Cl.
CPC ........... *B26D 3/163* (2013.01); *B23D 45/042* (2013.01); *B24B 23/02* (2013.01); *B24B 23/08* (2013.01); *B24B 27/065* (2013.01); *B26D 3/164* (2013.01); *B26D 7/02* (2013.01); *B26D 7/2621* (2013.01); *Y10T 83/68* (2015.04); *Y10T 83/7693* (2015.04); *Y10T 83/7788* (2015.04)

(58) Field of Classification Search
CPC .......... B26D 6/16; B26D 6/166; B26D 6/167; B26D 6/168; B26D 7/2621; B26D 3/16; B26D 3/166; B26D 3/167; B26D 3/168; E01B 31/04; B23D 45/12; B23D 45/006; B23D 45/042; B24B 27/065; B24B 23/08

USPC .................................... 83/490, 745; 451/439
See application file for complete search history.

(56) References Cited

U.S. PATENT DOCUMENTS

| | | | |
|---|---|---|---|
| 201,262 A | 3/1878 | McDowell | |
| 1,077,196 A | 10/1913 | Hall, Jr. | |
| 1,108,718 A * | 8/1914 | Dawson | ................ B27B 11/00 |
| | | | 83/743 |
| 1,206,311 A | 11/1916 | Dillinger | |

(Continued)

FOREIGN PATENT DOCUMENTS

| | | |
|---|---|---|
| CN | 105356687 | 10/2017 |
| CN | 206544142 | 10/2017 |

(Continued)

OTHER PUBLICATIONS

Brian Shimp, "The Surefire Way to Get a Blower Wheel Off," hvacrschool.com. Accessed: Sep, 3, 2019, https://web.archive.org/web/20190903154933/https//www.hvacrschool.com/surefire-way-get-blower-wheel-off/.

(Continued)

*Primary Examiner* — Clark F Dexter
(74) *Attorney, Agent, or Firm* — Kenneth H. Jack; Davis & Jack, L.L.C.

(57) ABSTRACT

A shaft cutting tool incorporating a scissor assembly having a first arm, a second arm, and a hinge interconnecting the arms' proximal ends; a shaft mount attached to the first arm's distal end; and a cutting wheel assembly operatively mounted within a hollow bore formed at the second arm's distal end; wherein the cutting wheel assembly includes a drive axle and rotary bearing; and wherein the drive axle extends oppositely from the cutting wheel for engagement with a portable electric drill.

13 Claims, 6 Drawing Sheets

(56) References Cited

U.S. PATENT DOCUMENTS

| | | | |
|---|---|---|---|
| 1,336,501 A * | 4/1920 | Blanckensee | B23D 47/04 83/277 |
| 2,081,360 A * | 5/1937 | Mall | E01B 31/17 451/429 |
| 2,214,141 A * | 9/1940 | Mall | B23D 45/006 451/429 |
| 2,787,265 A | 4/1957 | Neidt | |
| 2,809,697 A | 10/1957 | Menzies | |
| 3,136,057 A | 6/1964 | Jones et al. | |
| 3,325,946 A * | 6/1967 | Lange | B24B 27/065 451/121 |
| 3,393,442 A | 7/1968 | Brewer | |
| 3,974,596 A * | 8/1976 | Huboud-Peron | E01B 31/04 451/347 |
| 4,057,899 A | 11/1977 | Ostendorf | |
| 4,068,415 A * | 1/1978 | McIlrath | B23D 45/006 451/347 |
| 4,077,103 A | 3/1978 | Kelley | |
| 4,156,991 A * | 6/1979 | McIlrath | B23D 45/006 451/347 |
| D255,768 S | 7/1980 | Immel et al. | |
| 4,401,003 A * | 8/1983 | Baldwin et al. | B26D 1/16 83/454 |
| 4,457,033 A | 7/1984 | Lightner | |
| 4,765,098 A * | 8/1988 | Duff et al. | B23D 45/003 451/236 |
| 4,841,643 A * | 6/1989 | Colella et al. | B23D 51/02 30/393 |
| 4,958,434 A | 9/1990 | Marschner | |
| 5,067,219 A | 11/1991 | Ulmer | |
| 5,479,688 A | 1/1996 | Rubino et al. | |
| 5,545,079 A * | 8/1996 | Larsson et al. | B23D 45/006 125/13.01 |
| 5,687,627 A * | 11/1997 | Wilson | B23D 45/006 30/372 |
| 6,042,461 A * | 3/2000 | Pearson | B23D 45/006 451/342 |
| 6,418,600 B1 | 7/2002 | Benoit | |
| 6,654,997 B2 | 12/2003 | Donovan et al. | |
| 6,671,962 B2 | 1/2004 | Watamura | |
| 6,684,472 B2 | 2/2004 | Abdelmoula et al. | |
| 6,976,909 B1 * | 12/2005 | Hoover | B24B 23/02 451/354 |
| 7,125,206 B2 | 10/2006 | Turner | |
| 7,152,325 B2 | 12/2006 | Green et al. | |
| 8,261,454 B2 | 9/2012 | Wilson, Jr. | |
| 8,276,577 B2 * | 10/2012 | Wills, II | B27B 5/10 125/13.01 |
| 8,998,684 B2 * | 4/2015 | Rosani et al. | B23D 45/006 451/347 |
| 9,017,148 B2 * | 4/2015 | Barezzani et al. | E01B 31/04 451/347 |
| 9,325,227 B2 | 4/2016 | Survant | |
| 9,566,652 B2 | 2/2017 | Nasiell | |
| 9,808,922 B2 | 11/2017 | Breschi et al. | |
| 9,962,820 B2 | 5/2018 | Durbin et al. | |
| 2006/0085987 A1 * | 4/2006 | Gordon | B23D 21/06 30/92 |
| 2009/0022559 A1 | 1/2009 | Hughes, Jr. | |
| 2016/0108583 A1 * | 4/2016 | Ericsson | E01B 31/04 30/372 |

FOREIGN PATENT DOCUMENTS

| | | | |
|---|---|---|---|
| DE | 202006006932 | 7/2006 | |
| GB | 348456 A * | 5/1931 | E01B 31/04 |
| JP | 6066654 | 4/1985 | |
| WO | WO 2019/145611 * | 8/2019 | E01B 31/04 |

OTHER PUBLICATIONS

Ecman51, "Blower motor stuck on blower wheel," doityourself.com. Nov. 11, 2012. https://web.archive.org/web/20121111050557/http://www.doityourself.com/forum/gas-oil-home-heating-furnaces/402818-blower-motor-stuck-blowerwheel.html.

MechanicalDvr . "Blower wheel stuck on shaft," hvacsite.com. Sep. 27, 2011. https://web.archive.org/web/20110927040016/http://www.hvacsite.com/f7/blower-wheel-stuck-shaft-152/.

"Fan Blade/Wheel Puller . Cast Iron," grainger .com https://web.archive.org/web/20190903161635/https://www.grainger .com/product/DAYTON-Fan-Blade-Wheel-Puller-2PYL8.

Refer guy , "squirrel cage' removal," hvac-talk.com. Sep. 12, 2015. http://hvac-talk.com/vbb/showthread.php?157930-quot-squirrel-cage-quotremoval.

* cited by examiner

SHAFT CUTTING TOOL

FIELD OF THE INVENTION

This invention relates to rotary abrasive wheel and rotary blade cutting tools. More particularly, this invention relates to such tools which are specially adapted for cross cutting elongated metal bars, axles, and shafts.

BACKGROUND OF THE INVENTION

A commonly known method for cross cutting a steel shaft provides a rotary cutting tool or assembly which axially attaches a rotary drive shaft or drill chuck engaging shank to a rotary metal cutting blade or to a thin abrasive cutting wheel. Upon securely attaching such rotary cutting assembly to the bit chuck of a portable electric drill or driver tool, the interconnected drill and rotary cutting tool combination may be utilized in the manner of a handheld power saw for cross cutting the steel shaft. Drawbacks and deficiencies of such known tool assembly and cutting method include the production of ragged and non-perpendicular cuts, along with cutting difficulties arising during utilization of the tool within obstructed or structurally tight spaces surrounding a shaft which is to be cut. Where shaft cutting must occur within tight spaces or narrow confines, operation of such a drill and rotary blade combination may be restricted to a single handed grasp of the tool, making it difficult to effect a clean consistent cut.

The instant inventive shaft cutting tool solves or ameliorates problems, defects, and deficiencies noted above by providing and utilizing a specially configured scissor arm assembly whose arms' distal ends are specially adapted for securely engaging and holding a shaft to be cross cut and for arcuately guiding a rotating blade within a perpendicular plane and through the shaft. The tool of the instant invention effectively guides drill actuated rotary blade cutting of a steel shaft, for advantageously producing a clean perpendicular cut within a constrained work space.

BRIEF SUMMARY OF THE INVENTION

A first structural component of the instant inventive shaft cutting tool comprises a scissor arms assembly or pair of scissor arms whose proximal ends are pivotally or hingedly attached to each other. Assuming that an abrasive rotary cutting wheel or toothed circular saw blade component of the tool has a preferred diameter of approximately 3", the arms of the tool's scissor arms assembly are preferably 2"-2½" in length. In a preferred embodiment, the hinge which interconnects the scissor arms comprises a pin, eyed clevis, and eyed tang combination joint. The scissor arms are preferably composed of a durable material such as aluminum or acrylonitrile butadiene styrene (ABS) plastic.

A further structural component of the instant inventive shaft cutting tool comprises a shaft mount which is either fixedly attached to or formed wholly as an integral part of the distal end of one of the scissor arms. In a preferred embodiment, the shaft mount comprises a sleeve clamp having an inside diameter which is slightly greater than the outside diameter of a common gauge, ½" diameter for example, of steel shaft to be cut by the tool. Suitably, the shaft mount component may alternatively comprise a "C" clamp or "C" bracket which forms a shaft receiving throat having a width sufficient to receive the steel shaft. In a preferred embodiment, the shaft mounting sleeve clamp or "C" bracket, as the case may be, includes a set screw which allows the bracket to securely clamp and hold the shaft during cutting.

A further structural component of the instant inventive cutting tool comprises a rotary cutter assembly which is mounted operatively at the distal end of the tool's other scissor arm. In a preferred embodiment, the rotary cutter assembly comprises an abrasive steel cutting wheel or toothed circular saw blade. Where the tool's cutting element presents a circumferential abrasive edge, such edge preferably includes imbedded granules of diamond or cubic boron nitride for efficient steel cutting. Alternatively, where the cutting element comprises a toothed circular blade, tips of the teeth are preferably impregnated by and hardened with tungsten carbide, titanium carbide, or cermet.

An end of an axle shaft is preferably fixedly bolted to the tool's rotary cutter, and a perpendicularly cantilevering extension of such shaft is preferably attached via rotary bearing to the distal end of the other scissor arm. In the preferred embodiment, such other distal arm end is molded or milled to include a hollow bore which is closely fitted for receipt of and secure holding of the rotary bearing. The axle shaft preferably extends beyond the rotary bearing in a further cantilevering fashion, such shaft extension being conveniently utilized as a shank which may be mounted within and rotatably driven by a bit chuck of a common portable electric drill or driver tool.

In use of the instant inventive shaft cutting tool, the shaft mount may slidably receive and engage a steel shaft to be cross cut. Thereafter, the preferably provided set screw may be tightened against such shaft, securely clamping and holding the tool in a perpendicular orientation with respect to the shaft. Thereafter, the bit chuck of a provided portable electric drill or driver tool may be engaged with the axle shaft's cantilevering extension. Thereafter, such portable tool may be actuated, and the tool along with its attached rotary cutter assembly may be pivotally moved in a scissoring or arm flexing motion toward the shaft and clamped scissor arm. Such arm flexing motion causes the rotating cutting blade or wheel to pivot and swing toward the steel shaft, and continued flexing motion effectively drives the rotating wheel or blade through the steel shaft, producing a perpendicular cut-off end. During such cutting, all functions of holding, aligning, and guiding the cutting wheel are performed by the inventive tool, advantageously allowing gross and imprecisely directed hand pressure upon the driver tool to effect a clean cross cut.

Accordingly, objects of the instant invention include the provision of a shaft cutting tool which incorporates structures as described above, and which arranges such structures in relation to each other in manners described above, for the performance of beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
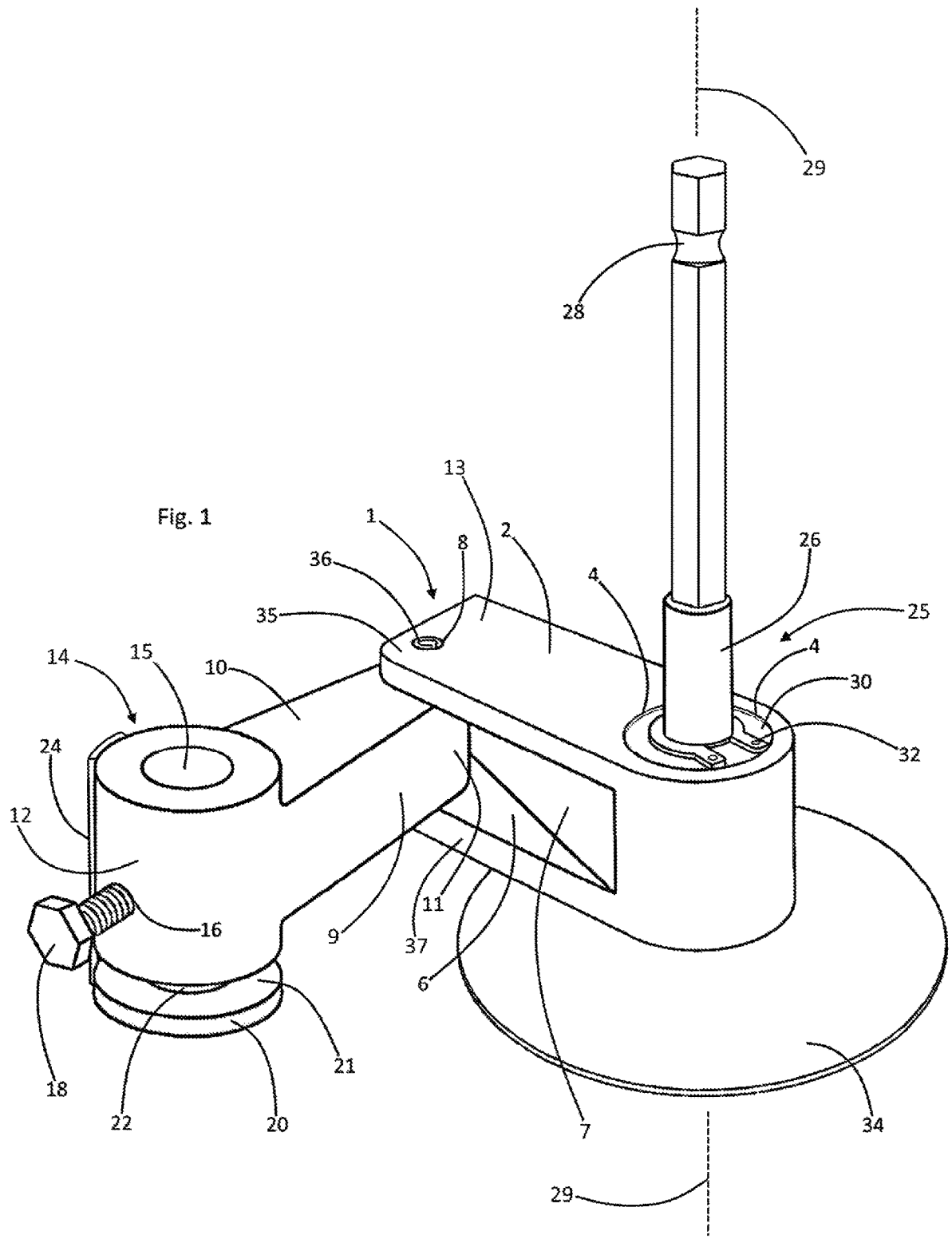
FIG. 1 is a perspective view of a preferred embodiment of the instant inventive shaft cutting tool.

Referring now to the drawings, and in particular to Drawing FIG. 1, a first structural component of the instant inventive shaft cutting tool comprises a scissor arms assembly or a pair of scissor arms which are referred to generally by Reference Arrow 1, such a scissor arms assembly comprising a first arm 10 and a second arm 2. In the preferred embodiment, the scissor arms assembly 1 is composed of aluminum or ABS plastic. Proximal ends 11 and 13 of the scissor arms 10 and 2 are hingedly or pivotally interconnected, such hinge preferably comprising a pin 36, aligned eyes 8, eyed clevis 35,37, and eyed tang combination joint, the eyed tang formed by the proximal end 11 of the scissor arm 10. The ears of the clevis 35 and 37 advantageously form a pivot clearance channel 6 which allows distal ends of arms 2 and 10 to pivotally flex into close proximity with each other. Arm faces 7 and 9 advantageously limit arm flexion at a desired angular orientation, as further discussed below.

Figure 6:
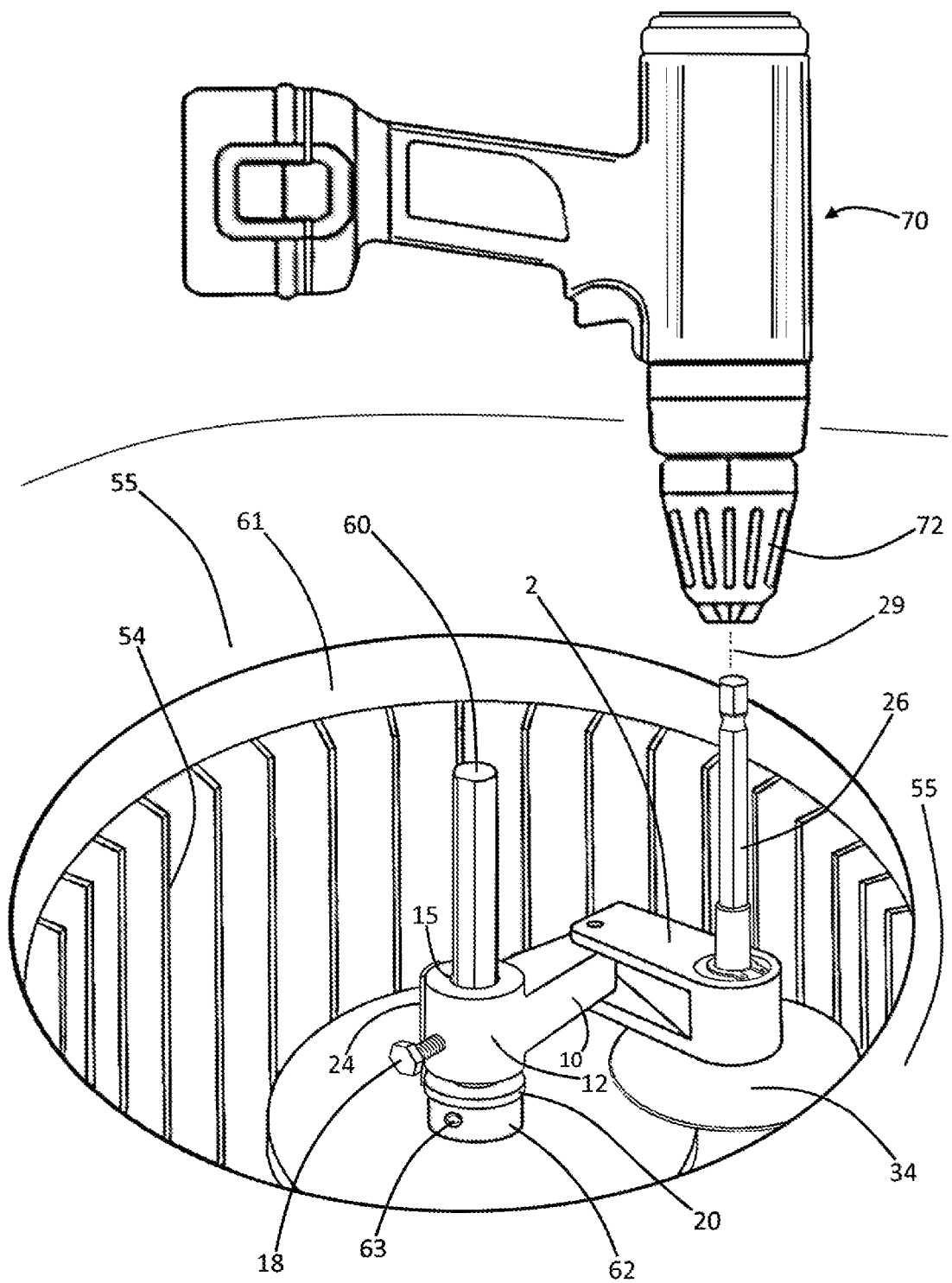
FIG. 6 is a partial and re-oriented view of a portion of the structure of FIG. 4, the view additionally showing the inventive cutting tool attached, and showing a cordless drill.

The distal end of one of the scissor arms, the first arm 10 for example, preferably rigidly supports an attached shaft mount component which is referred to generally by Reference Arrow 14, such mount component suitably being wholly formed or molded as an integral part of arm 10. The shaft mount component 14 is suitably configured as a cylindrical sleeve clamp 12 having a hollow bore 15 whose inside diameter is slightly larger than the outside diameter of a shaft to be cut by the tool. In the preferred embodiment, a helically threaded set screw 18 is mounted within a threaded channel 16 tapped through the wall of sleeve clamp 12. Referring simultaneously to FIGS. 1 and 6, clockwise turning of screw 18 causes its radially inner end to impinge against and to securely clamp and hold a steel shaft, fan shaft 60 for example, received within bore 15.

A shaft insertion stop plate 20 having a central shaft passage aperture 22 is preferably mounted beneath the sleeve clamp 12 by an extension arm 24. Such stop 20 and the adjacent end of sleeve clamp 12 are preferably spaced by arm 24 to form therebetween a cutting channel 21.

Figure 2:
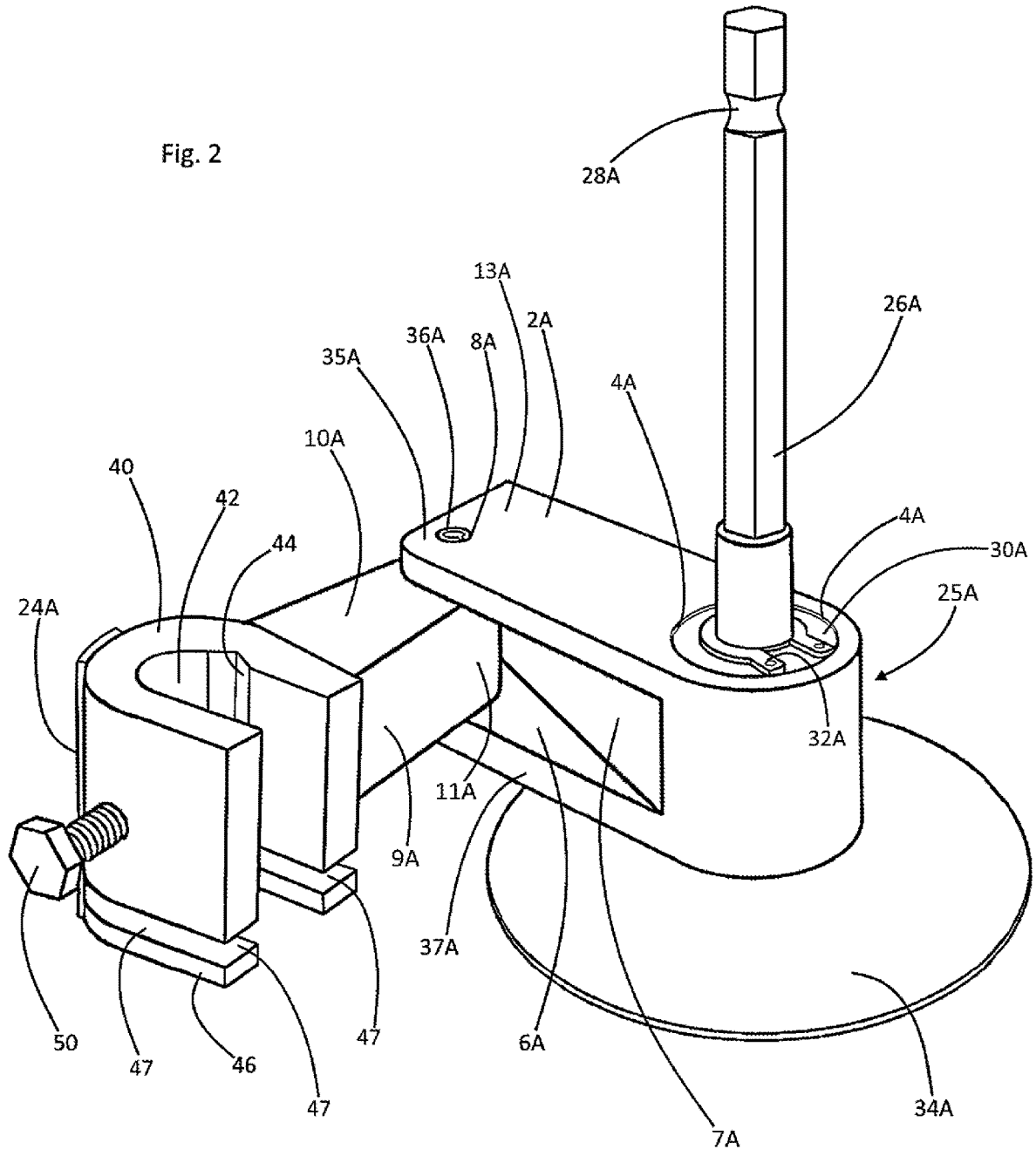
FIG. 2 presents an alternate configuration of the tool of FIG. 1.
Figure 3:
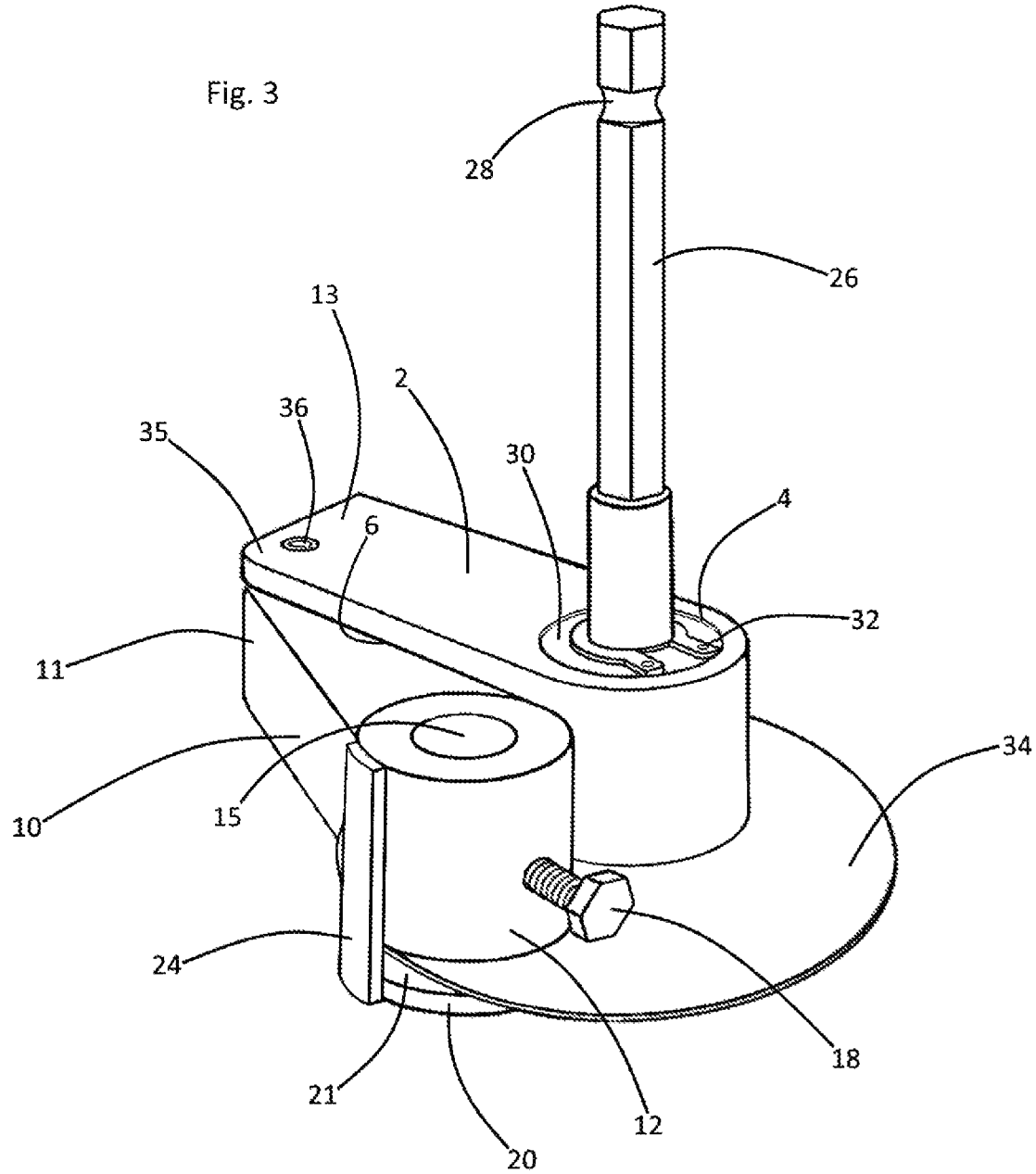
FIG. 3 redepicts the tool of FIG. 1, the view showing a re-orientation of mechanical parts.

Referring simultaneously to FIGS. 1 and 2, all structures appearing in FIG. 2 which are identified by a reference numeral having a suffix "A" are configured substantially identically with similarly numbered structures appearing in FIG. 1. In the alternative tool configuration of FIG. 2, the shaft mount component which is attached or wholly formed at the distal end of scissor arm 10A comprises a "C" clamp or bracket 40 whose throat 42 has a width sufficient to receive and retain a commonly gauged steel shaft. A "C" shaped insertion stop 46 functions similarly to insertion stop 20 of the FIG. 1 tool, such stop 46 being similarly suspended adjacent to bracket 42 by extension arm 24A to form a cutting channel 47. A shaft centering and perpendicular aligning groove 44 is preferably formed at the radially inner wall of the "C" bracket 40, and a set screw 50 is provided for securely clamping and holding the workpiece shaft within such throat 42 and within groove 44.

Referring again to FIG. 1, the distal end of the other arm 2 of the scissor arm assembly 1 preferably presents an operatively mounted rotary cutter assembly which is referred to generally by Reference Arrow 25. The cutter assembly 25 suitably comprises an abrasive cutting wheel 34 which is intended as being representative of a suitably alternatively utilized toothed circular saw blade. Where the rotary cutting element 34 is abrasive, its peripheral grinding surface is preferably impregnated with diamond or cubic boron nitride granules for steel cutting and grinding. Where a toothed circular saw blade is alternatively provided, the cutting teeth are preferably hardened with tungsten carbide, titanium carbide, or cermet for efficient steel cutting.

A drive axle 26 is preferably rigidly attached to the cutting wheel 34, and a rotary bearing 30 centers the axle 26 within a cylindrical hollow bore 4 which is formed at the distal end of scissor arm 2. The rotary bearing 30 is preferably pressure fitted or adhesively bonded within bore 4, and a "C" clip 32 is provided for holding the drive axle 26 within bearing 30. The end of the axle 26 which extends oppositely from the cutting wheel 34 preferably includes a quick attach/quick disconnect adaptation 28 for easy engagement with and disengagement from a portable electric drill or driver tool.

Figure 4:
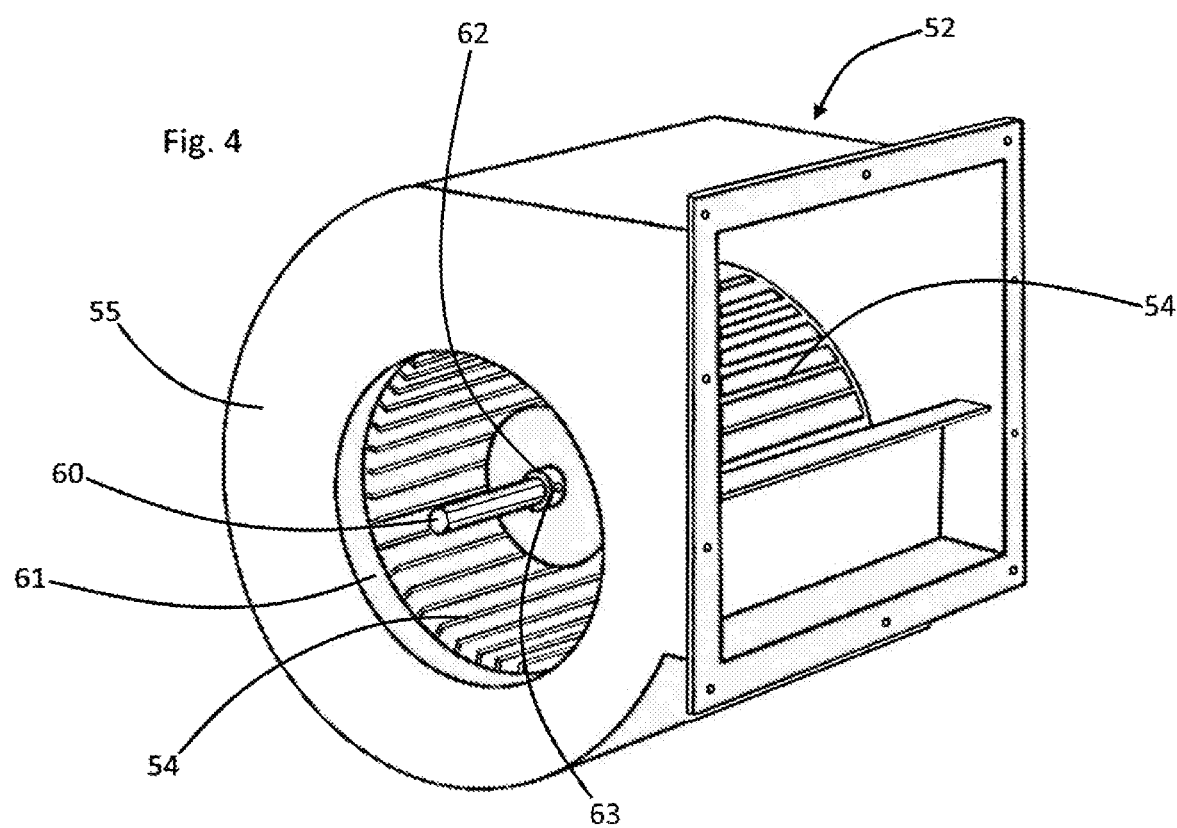
FIG. 4 is a perspective view of a heating and air conditioning unit blower.
Figure 5:
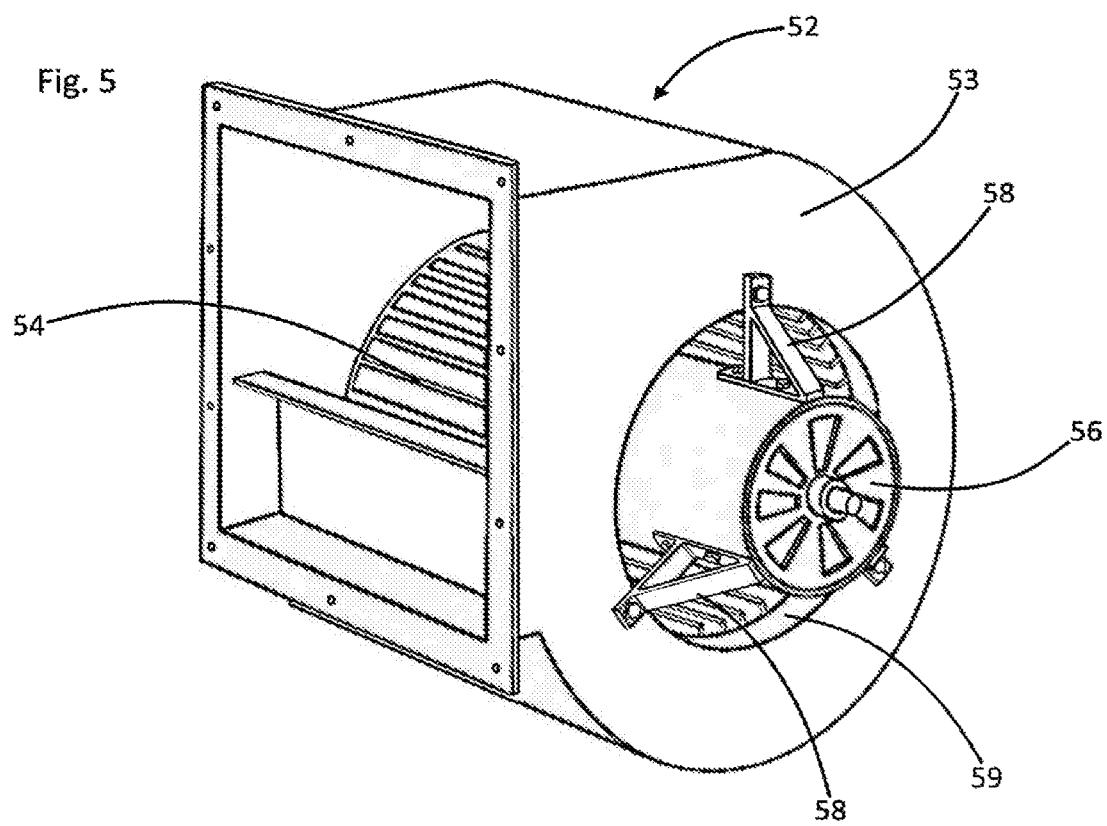
FIG. 5 is a reverse perspective view of the structure of FIG. 4.

Referring to FIGS. 4 and 5, a heating and air conditioning unit blower 52 constitutes a tool usage environment within which the inventive cutting tool may be advantageously used. In situations where the electric motor 56 of the blower unit 52 is worn out and in need of replacement, such motor may, on occasion, be simply and easily removed by disconnecting mounting brackets 58, and by releasing set screw 63 at hub 62 from its clamping engagement with the blower's drive axle 60. However, in many instances the mounting hub 62 will have previously become seized upon or stuck upon shaft 60. Upon such joint seizure, disengagements of the set screw 63 and the mounting brackets 58 will not effectively release the motor 56 from the blower's squirrel cage or scirocco fan 54. In such circumstances, the motor 56 cannot be withdrawn and replaced because the fan 54 is typically too large to pass through either of the blower unit's side wall ports 59 and 61 in side walls 53 and 55, respectively.

Figure 7:
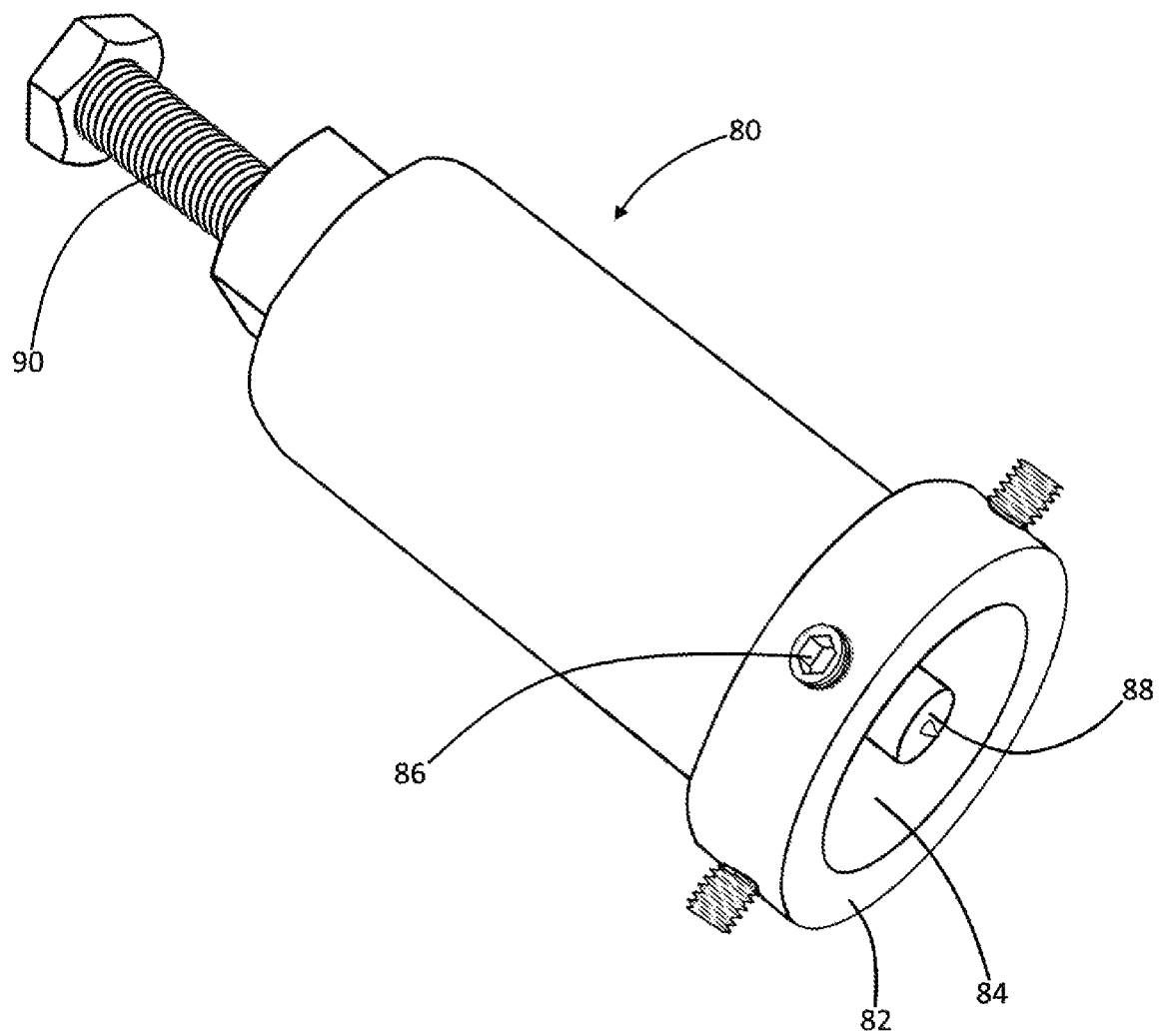
FIG. 7 is a drive shaft pressing tool.

In some circumstances, referring simultaneously to FIGS. 4 and 7, a shaft pushing tool 80 may be utilized for laterally driving a shaft such as fan drive shaft 60 out of hub 62. During normal usage of the pusher tool 80, plunger 88 is initially withdrawn through counter-clockwise turning of threaded shaft 90. Thereafter, tool head 82 may be slidably placed over hub 62, causing the hub 62 to nestingly enter tool head space 84.

Thereafter, set screws 86 may be turned to securely clamp the tool head 82 onto hub 62. Thereafter, threaded shaft 90 may be turned clockwise causing the opposite end of plunger 88 to press against the end of axle 60, forcefully driving the fan shaft 60 out of hub 62. However, as is indicated by an excess fan drive shaft extension depicted in FIG. 4, blower fan drive shafts often have an OEM excess length which undesirably frustrates any attempt to utilize a shaft pushing tool such as tool 80 during a blower motor removal and replacement operation.

Referring further simultaneously to FIG. 6, in order to allow a tool such as pusher tool 80 to be utilized for driving fan drive shaft 60 out of hub 62, an operator of the instant inventive tool may initially turn set screw 18 counter-clockwise to withdraw its inner end from bore 15. Thereafter, sleeve clamp 12 may be slidably guided over fan drive shaft 60 until insertion stop 20 contacts the surface of hub 62. Thereafter, set screw 18 may be turned clockwise, effectively clamping the inventive tool onto the excess extension of the fan drive shaft 60.

Thereafter, a provided portable electric drill or driver tool 70 may be attached to the cutting wheel assembly's rotary drive shaft 26 via manipulation of drill chuck 72. Thereafter, the drill 70 may be actuated, causing the cutting wheel 34 to spin. Thereafter, the operator may pivot or flex the entire interconnected assembly 70, 72, 26, 34, 2, about hinge pin 36, causing the rotating edge of wheel 34 to enter cutting channel 21 between the sleeve clamp 12 and the insertion stop 20. Such flexing motion advantageously causes the cutting wheel 34 to impinge against and commence cutting the fan drive shaft 60, such cutting action preferably continuing until the fan drive shaft is through cut.

In a preferred embodiment of the inventive tool, arm faces 7 and 9 are positioned in relation to arms 2 and 10 so that, upon contact of such surfaces with each other, the cutting edge of wheel 34 passes aperture 22 and bore 15 without any undesirable cutting impingement of such wheel against suspension arm 24. Such specialized sizing and positioning of arm faces 7 and 9 advantageously allows the shaft 60, the drill 70, the arms 2 and 10, the cutting wheel 34, and the insertion stop 20 to remain interconnected following complete shaft cutting, advantageously avoiding any undesirable movements or impinging contacts against fan blades of fan 54. Upon complete scissor arm flexion of arms 2 and 10, the radially inner face of extension arm 24 which is exposed within channel 21 is preferably spaced radially from rotation axis 29 a distance which is slightly greater than 1½". Correspondingly, the rotary cutting element 34 preferably constitutes an abrasive cutting wheel or cutoff wheel having a maximum beginning or unused diameter of 3". Such maximum diameter assures that, upon complete flexion contact of arm faces 7 and 9 against each other, the cutting edge of wheel 34 extends perpendicularly from rotation axis 29 a distance no more than 1½". Such mechanical coordination of the diameter of the wheel 34 and the radial displacement of the extension arm assures that wheel 34 will not sever the insertion stop 20 during usage of the tool.

As a result of usage over time, the abrasive wheel 34 may wear and reduce in diameter. In order to preserve the functionality of the inventive tool during such abrasive wheel wear, the sleeve clamp 12 preferably includes a substantial wall thickness, for example a suitable 0.375 inch wall thickness. Such exemplary 0.375 inch wall thickness of sleeve clamp 12 will advantageously accommodate approximately 0.375 inches of wear of cutting wheel 34, advantageously allowing long term and repeated use of the cutting wheel.

Referring again to FIG. 6, upon complete through cutting of fan drive shaft 60, the operator may simply and conveniently withdraw the entire interconnected and released assembly 70, 72, 26, 34, 2, 10, 12, 60, from fan housing opening 61. Thereafter, the axle pushing tool 80 may be easily and conveniently attached over the shortened shaft 60 onto hub 62, and such tool may be operated in a conventional fashion to drive the shaft 60 out of such hub. Thereafter, motor 56 may be withdrawn from aperture 59, leaving fan 54 within the housing.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention claimed is:

1. A tool for cutting an axle shaft, said tool comprising:
   (a) a scissor arms assembly having a first arm having proximal and distal ends, having a second arm having proximal and distal ends, and having a hinge interconnecting said arms' proximal ends;
   (b) a cylindrical sleeve having a hollow bore and having a wall, said sleeve being fixedly attached to or formed wholly with the first arm's distal end, wherein the hollow bore is sized for receiving the axle shaft;
   (c) a threaded channel extending through the wall;
   (d) a set screw received within the threaded channel, wherein upon a receipt of the axle shaft within the hollow bore and upon turning the set screw, the set screw holds the axle shaft against the wall; and
   (e) a cutting wheel assembly comprising a cutting wheel, the cutting wheel assembly operatively mounted at the second arm's distal end and movable along with said second arm's distal end about said hinge toward an axis extending through both ends of said hollow bore such that said cutting wheel is movable through said axis for cutting the axle shaft held in said cylindrical sleeve.

2. The tool of claim 1 wherein the cutting wheel assembly further comprises a drive axle and rotary bearing combination.

3. The tool of claim 2 further comprising a hollow bore extending through the second arm's distal end, said bore receiving the drive axle and rotary bearing combination.

4. The tool of claim 3 wherein the drive axle has a drill chuck attachment end, and wherein the drill chuck attachment end extends oppositely from the cutting wheel.

5. The tool of claim 4 further comprising a shaft insertion stop fixedly attached to the cylindrical sleeve.

6. The tool of claim 5 further comprising a cutting channel bounded by the cylindrical sleeve and by the shaft insertion stop.

7. The tool of claim 1 wherein the hinge comprises a clevis, pin, and tang joint.

8. The tool of claim 7 wherein the clevis comprises a pair of ears, and further comprising a pivot clearance channel opening at the proximal end of one of the first arm and the second arm, wherein said pivot clearance channel is bounded by said ears.

9. The tool of claim 8 wherein the proximal end of the other of the first arm and the second arm comprises the tang, the tang being received within said pivot clearance channel between the clevis's pair of ears.

10. A tool for cutting an axle shaft, said tool comprising:
    (a) a scissor arms assembly having a first arm having proximal and distal ends, having a second arm having proximal and distal ends, and having a hinge interconnecting said arms' proximal ends;
    (b) a "C" clamp having a pair of walls defining a throat, said "C" clamp being fixedly attached to or formed wholly with the first arm's distal end, wherein the "C" clamp is sized for receiving the axle shaft;
    (c) a shaft aligning concavity within one of walls;
    (d) a threaded channel extending through the other wall among the throat's pair of walls;
    (e) a set screw received within the threaded channel;
    (f) a cutting wheel assembly comprising a cutting wheel within a cutting plane, the cutting wheel assembly further comprising a drive axle and rotary bearing combination, wherein the drive axle has a drill chuck attachment end extending oppositely from the cutting wheel, wherein the cutting wheel assembly is operatively mounted at the second arm's distal end and, wherein, upon a receipt of the axle shaft within the throat and upon turning the set screw, the set screw holds the axle shaft against the shaft aligning concavity;
(g) a hollow bore extending through the second arm's distal end, said bore receiving the drive axle and rotary bearing combination;
(h) a shaft insertion stop fixedly attached to the "C" clamp; and
(i) a cutting channel bounded by the "C" clamp and by the shaft insertion stop, wherein the cutting plane extends through the cutting channel.

11. The tool of claim 10 wherein the hinge comprises a clevis, pin, and tang joint.

12. The tool of claim 11 wherein the clevis comprises a pair of ears, and further comprising a pivot clearance channel opening at the proximal end of one of the first arm and the second arm, wherein said pivot clearance channel is bounded by said ears.

13. The tool of claim 12 wherein the proximal end of the other of the first arm and the second arm comprises the tang, the tang being received within said pivot clearance channel between the clevis's pair of ears.

* * * * *